US012645111B2

(12) United States Patent (10) Patent No.: US 12,645,111 B2
Lee et al. (45) Date of Patent: Jun. 2, 2026

(54) METHOD FOR PRODUCING A COMPLEX SHEET AND A DISPLAY PANEL COMPRISING THE COMPLEX SHEET

(71) Applicant: LG Display Co., Ltd., Seoul (KR)

(72) Inventors: Inwha Lee, Paju-si (KR); Yoonhyung Joo, Paju-si (KR); Chulgoo Son, Paju-si (KR); Suncheol Hwangbo, Paju-si (KR); Junsoo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 813 days.

(21) Appl. No.: 17/975,205

(22) Filed: Oct. 27, 2022

(65) Prior Publication Data

US 2023/0204993 A1 Jun. 29, 2023

(30) Foreign Application Priority Data

Dec. 29, 2021 (KR) ........................ 10-2021-0191443

(51) Int. Cl.
G02F 1/1333 (2006.01)
G02F 1/1335 (2006.01)
(52) U.S. Cl.
CPC .. G02F 1/133311 (2021.01); G02F 1/133504 (2013.01); G02F 1/133607 (2021.01)
(58) Field of Classification Search
None
See application file for complete search history.

(56) References Cited

U.S. PATENT DOCUMENTS

| | | | |
|---|---|---|---|
| 9,645,423 B2 | 5/2017 | Seo et al. | |
| 11,693,172 B2 | 7/2023 | Lee et al. | |
| 2004/0212884 A1 | 10/2004 | Satake et al. | |
| 2008/0055934 A1* | 3/2008 | Nagao | G02B 5/0284 |
| | | | 362/620 |
| 2010/0165243 A1* | 7/2010 | Yoon | G02B 6/0053 |
| | | | 362/606 |
| 2015/0277180 A1 | 10/2015 | Seo et al. | |
| 2018/0307092 A1* | 10/2018 | Lin | G02B 6/0051 |
| 2021/0072598 A1* | 3/2021 | Walker | G02B 5/0278 |
| 2021/0191028 A1 | 6/2021 | Lee et al. | |

FOREIGN PATENT DOCUMENTS

| | | |
|---|---|---|
| CN | 1525195 A | 9/2004 |
| CN | 101770045 A | 7/2010 |
| CN | 108732811 A | 11/2018 |
| KR | 10-2010-0080075 A | 7/2010 |
| KR | 10-2016-0047652 A | 5/2016 |
| KR | 10-2019-0118698 A | 10/2019 |
| KR | 10-2119583 A1 | 6/2020 |

OTHER PUBLICATIONS

China National Intellectual Property Administration, Office Action, Chinese Patent Application No. 202211344860.8, Mar. 29, 2025, 19 pages.
Korean Intellectual Property Office, Office Action, Korean Patent Application No. 10-2021-0191443, Sep. 13, 2024, 12 pages.

* cited by examiner

*Primary Examiner* — Phu Vu
(74) *Attorney, Agent, or Firm* — Fenwick & West LLP

(57) ABSTRACT
A complex sheet, a method for producing the complex sheet, and a display panel including the complex sheet is disclosed. The complex sheet reduces moisture penetration by forming a side cover that covers an opening included in an edge of a light refracting layer that is included in the complex sheet.

21 Claims, 18 Drawing Sheets

LIGHT        LIGHT

METHOD FOR PRODUCING A COMPLEX SHEET AND A DISPLAY PANEL COMPRISING THE COMPLEX SHEET

CROSS-REFERENCE TO RELATED APPLICATIONS

The present application claims priority to Republic of Korea Patent Application No. 10-2021-0191443, filed on Dec. 29, 2021, which is hereby incorporated by reference in its entirety.

BACKGROUND

Field

The present disclosure relates to a method for producing a complex sheet and a display panel including the complex sheet. More particularly, the present disclosure relates to a method for producing a complex sheet that can prevent or at least reduce moisture penetration by forming a side cover, and a display panel including the complex sheet.

Description of the Related Art

A liquid crystal display is one of the most widely used display devices. In general, a liquid crystal display device includes a liquid crystal display panel including a light source and a liquid crystal layer.

In order for light moving from the light source to the liquid crystal display panel to be uniformly distributed throughout the liquid crystal display panel, optical sheets are used that have a plurality of thick layers and a diffusing plate having a relatively large thickness.

The optical sheet may have a form in which a plurality of prisms having a shape of a triangular prism are arranged. In this case, a space is formed between the prisms. Moisture can easily penetrate into such space. When moisture penetrates into the optical sheet, the moisture is spread throughout the optical sheet due to capillary phenomenon. Accordingly, the function of the optical sheet is lowered, and the screen quality of the display panel is deteriorated.

SUMMARY

The present disclosure solves the above problems, and provides a method for producing a complex sheet capable of reducing or preventing quality deterioration by preventing or at least reducing penetration of moisture into an optical sheet and a display panel including the complex sheet.

In one embodiment, a method for producing a complex sheet comprises: forming a first support layer; forming a light refracting layer on the first support layer, the light refracting layer including a plurality of light refracting elements; forming a second support layer on the light refracting layer, wherein the first support layer, the light refracting layer, and the second support layer collectively form a complex sheet; attaching the complex sheet on a rear surface of a panel layer; and cutting the complex sheet at an incline by irradiating a laser beam that penetrates the second support layer, the light refracting layer, and the first support layer, the irradiating of the laser beam covering an opening at an edge of the light refracting layer.

In one embodiment, a display panel comprises: a panel layer; a complex sheet on a rear surface of the panel layer, the complex sheet including a planar portion and an inclined portion; and a case in which the panel layer and the complex sheet are disposed, wherein the complex sheet includes: a first support layer on the rear surface of the panel layer, the first support layer including a first material; a light refracting layer on a rear surface of the first support layer, the light refracting layer including a second material; a second support layer on a rear surface of the light refracting layer, the second support layer including the first material; and a side cover on the inclined portion of the complex sheet, the side cover covering an opening at an edge of the light refracting layer.

In one embodiment, a complex sheet comprises: a first support layer including a first material; a light refracting layer on the first support layer, the light refracting layer including a plurality of light refracting elements of a second material that is different from the first material; a second support layer on the light refracting layer, the second support layer including the first material; and a side cover disposed at an angle on the first supporting layer, the light refracting layer, and the second support layer, the side cover covering an opening at an edge of the light refracting layer due to a shape of the plurality of light refracting elements.

In the complex sheet according to the present disclosure, moisture penetration may be reduced or prevented by the side cover.

The complex sheet according to the present disclosure may reduce or prevent deterioration of screen quality of the display panel.

DETAILED DESCRIPTION

Figure 1:
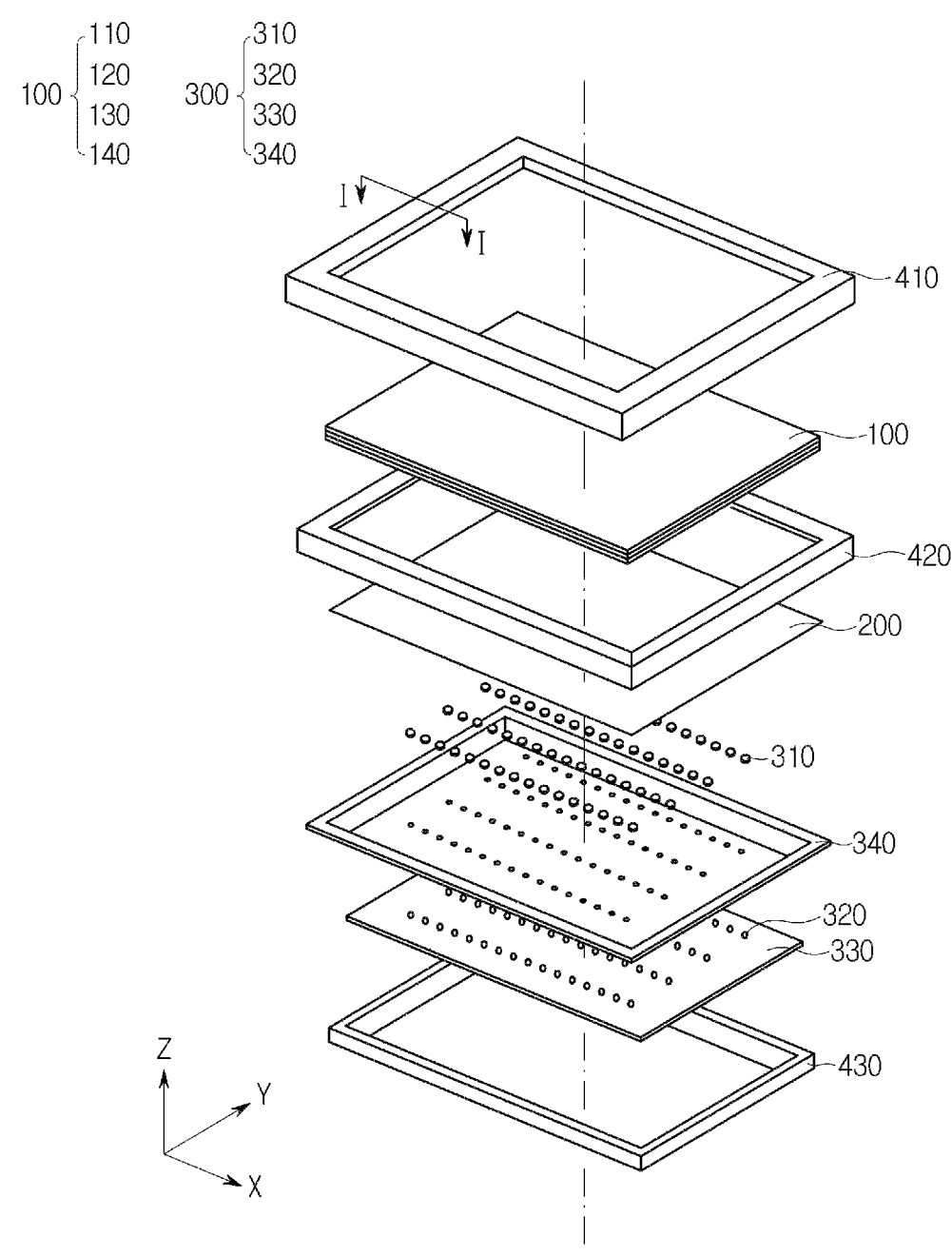
FIG. 1 is an exploded perspective view showing a display panel according to an embodiment of the present disclosure.

Hereinafter, embodiments will be described with reference to the accompanying drawings. Herein, when it is mentioned that a component (or an area, a layer, a part, etc.) is "on", "connected to", or "coupled to" another component, it may mean that the component may be directly connected/coupled to the other component or a third component may be disposed therebetween.

Like reference numerals refer to like components. Throughout the drawings, thicknesses, ratios, and dimensions of components are exaggerated for effective description of technical matters. "and/or" may include one or more combinations that may be defined by related components.

Terms such as first, second, etc., may be used to describe various components, but the components are not limited to those terms. These terms may be used for the purpose of distinguishing one component from another component. For example, a first element may be named as a second element without departing from the right scope described herein, and similarly, a second element may be named as a first element. Singular forms include plural forms unless apparently indicated otherwise contextually.

Terms such as "under", below", "on", "above", etc., are used to describe a relationship between components shown in the drawings. Those terms have relative concepts and are described based on a direction shown in the drawings.

Terms "include", "have", or the like are to indicate the presence of features, numbers, steps, operations, elements, parts, or a combination thereof described herein, and does not preclude the presence or addition of one or more other features, numbers, steps, operations, elements, parts, or a combination thereof.

In addition, the present disclosure will be described as an exemplary liquid crystal display (LCD) panel for convenience of description. However, the spirit of the present disclosure is not limited to a liquid crystal display panel, and may be equally applied to other types of display panels, such as an organic light emitting display panel, a mini LED display panel, and the like.

In addition, for convenience of description, the present disclosure will be exemplarily described with respect to a direct light type liquid crystal display panel. However, the spirit of the present disclosure can be equally applied to other types, for example, to a side light type liquid crystal display panel.

Figure 2:
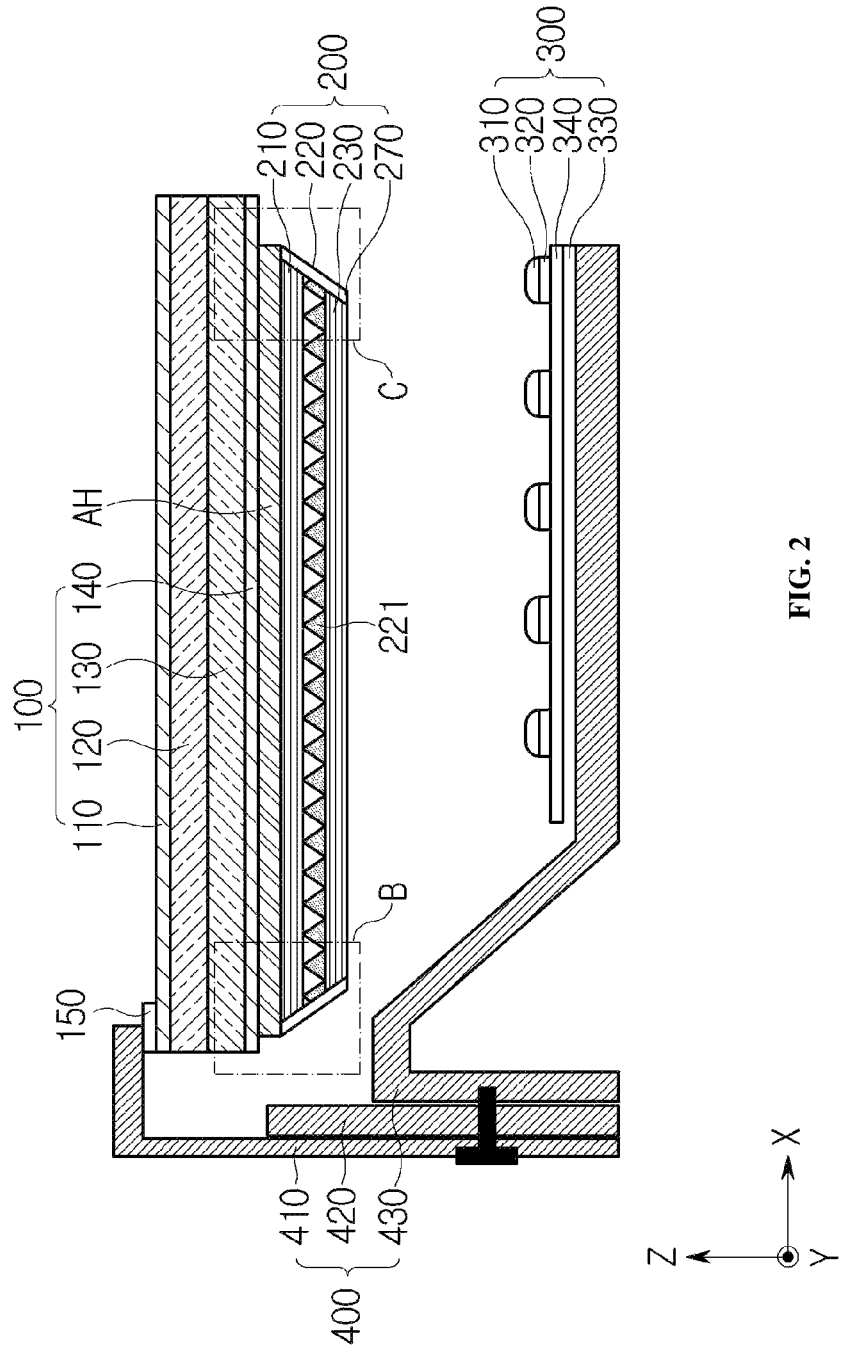
FIG. 2 is a cross-sectional view taken along line I-I of FIG. 1 according to an embodiment of the present disclosure.
Figure 3:
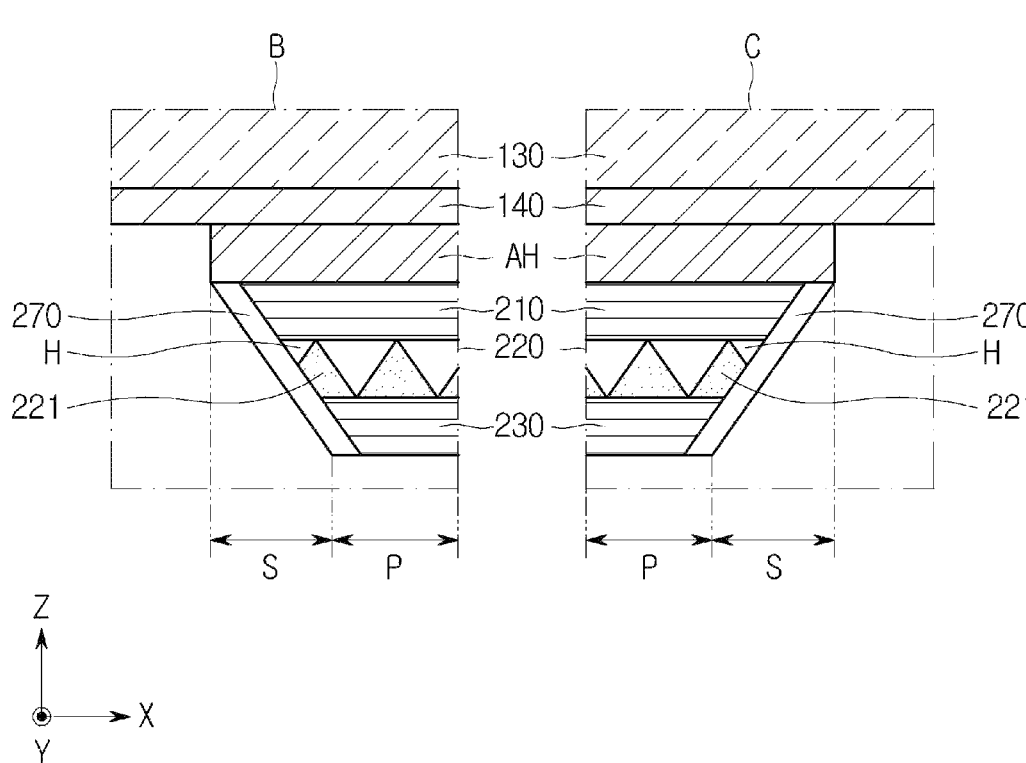
FIG. 3 is an enlarged view of portions B and C of FIG. 2 according to an embodiment of the present disclosure.

FIG. 1 is an exploded perspective view showing a display panel according to an embodiment of the present disclosure. FIG. 2 is a cross-sectional view taken along line I-I of FIG. 1 according to an embodiment of the present disclosure. FIG. 3 is an enlarged view of portions B and C of FIG. 2 according to an embodiment of the present disclosure.

A display panel according to an embodiment of the present disclosure will be described with reference to FIGS. 1 to 3.

The display panel according to the present disclosure may include a panel layer 100, a complex sheet 200, a backlight driver 300, and a case 400.

The panel layer 100 may include a lower substrate 130 on which a switching element is disposed, an upper substrate 120 disposed on the lower substrate 130, and an upper polarizing film 110 disposed on an upper portion of the upper substrate 120 and a lower polarizing film 140 disposed on a lower portion of the lower substrate 130. The display panel may be a liquid crystal panel, and the panel layer 100 may include a liquid crystal layer. In the lower substrate 130, pixels may be respectively formed in each intersection area of the gate lines and the data lines. The pixel may include a thin film transistor, a common electrode, and a pixel electrode. The thin film transistor may serve as a switching device that transmits and controls an electrical signal to each pixel. A common voltage for driving the liquid crystal is applied to the common electrode. The pixel electrode may be disposed on a passivation layer covering the common electrode and be connected to the thin film transistor. The upper substrate 120 may include a color filter and a black matrix. R (Red), G (Green), and B (Blue) patterns may be formed on the color filter. The black matrix may be disposed between the R, G, and B patterns of the color filter. A column spacer for maintaining a cell gap may be disposed between the upper substrate 120 and the lower substrate 130.

The upper polarizing film 110 may be attached to the upper portion of the upper substrate 120, and the lower polarizing film 140 may be disposed to the lower portion of the lower substrate 130. The upper polarizing film 110 and the lower polarizing film 140 may have different polarization functions through an elongation process performed in directions opposite to each other, and may have contractile forces in directions opposite to each other according to the elongation. Due to the opposite contractile forces, the panel layer 100 can achieve a planar state without being bent upward or downward.

The complex sheet 200 may be formed on a rear surface of the panel layer 100. The rear surface refers to a downward direction of the display panel, and refers to the −Z axis direction. As shown in FIG. 2, an adhesive layer AH is formed on a rear surface (−Z direction) of the lower polarizing film 140 formed on a lower portion of the panel layer 100, and the complex sheet 200 may be attached to a rear surface of the adhesive layer AH.

The adhesive layer AH may be, for example, a pressure sensitive adhesive PSA or an optical clear adhesive OCA, and may be a transparent material to allow light emitted from a light source module 320 to pass therethrough.

The complex sheet 200 may include a first support layer 210, a light refracting layer 220, a second support layer 230, and a side cover 270. Specifically, the first support layer 210 may be formed on the rear surface of the panel layer 100 and may be formed of a first material. For example, the first material may be a polyethylene terephthalate PET material. The light refracting layer 220 may be formed on a rear surface of the first support layer 210. The light refracting layer 220 may refract light emitted from the lower light source module 320 and diffuse the light upwards. The light refracting layer 220 may include a plurality of prisms 221 disposed at regular intervals. The light refracting layer 220 may be formed of a second material. That is, the plurality of prisms 221 may be formed of the second material. For example, the second material may be a transparent material such as glass or plastic. The second support layer 230 may be formed on a rear surface of the light refracting layer 220. The second support layer 230 may be formed of the first material that is the same material as that of the first support layer 210. That is, the second support layer 230 may be formed of a PET material in one example.

In the present disclosure, the material constituting the support layers 210 and 230 is referred to as "first material", and the material constituting the light refracting layer 220 is referred to as "second material". The first material and the second material may be different from each other or the same as each other.

Referring to FIG. 3, the complex sheet 200 may include a planar portion P and an inclined portion S. Specifically, the inclined portion S may be formed along an outer peripheral surface of the complex sheet 200 such as at edges of the complex sheet 200. In addition, the inclined portion S may be formed in the shape of a closed loop. The planar portion P may be a remaining portion other than the inclined portion S of the complex sheet 200 and may be a planar portion having a shape horizontal to the X-Y plane. The planar portion P is between the inclined portions S. The inclined portion S of the complex sheet 200 may be formed in a reversed taper shape. For example, referring to FIGS. 2 and 3, the complex sheet 200 may have a reversed taper shape in which a width of the upper surface is greater than a width of the lower surface. Here, the upper surface of the complex sheet 200 may refer to an upper surface of the first support layer 210, and the lower surface of the complex sheet 200 may refer to a lower surface of the second support layer 230.

The side cover 270 may be formed on the inclined portion S. The side cover 270 may be formed along a periphery of the complex sheet 200. Accordingly, the side cover 270 may be formed along a side surface of the complex sheet 200 on the X-Y plane. Accordingly, the side cover 270 may be formed in the closed loop shape. The side cover 270 may close (e.g., cover) a space H that may be formed in the light refracting layer 220. Specifically, when the light refracting layer 220 includes the plurality of prisms 221, the space H may be an opening formed between the prisms 221 due to the triangular shape of the prisms 221. The space as such may be an exposed space in the periphery (e.g., the edge) of the complex sheet 200. Moisture may penetrate into this space H. In addition, due to capillary phenomenon, the moisture may be diffused throughout the complex sheet 200, which leads to deterioration of the quality of the display panel. The side cover 270 according to the present disclosure may serve to cover such space H. The side cover 270 will be described in detail below.

As shown in FIG. 3, a size of the prism 221 located in the outermost area may be different from a size of the prism 221 located in other areas between the outermost areas of the complex sheet 200. For example, the prism 221 located in the outermost area may have the smallest size amongst the prisms 221. Referring to FIG. 3, the width of the prism 221 located in the outermost area may be less than the width of the prism 221 located in the central area of the complex sheet 200. Specifically, the width of the prism 221 adjacent to the side cover 270 may be less than the width of the prism 221 disposed at a position corresponding to the central area of the panel.

Referring back to FIG. 2, the complex sheet 200 may be directly attached to the rear surface of the panel layer 100. The direct attachment may mean that there is no space between the complex sheet 200 and the panel layer 100. As shown in FIG. 2, the complex sheet 200 may be directly attached to the panel layer 100 through the adhesive layer AH. In contrast to the present disclosure, in the conventional art, in order to secure a predetermined light path, the complex sheet 200 and the panel layer 100 were spaced apart from each other by a predetermined distance in general. Unlike the conventional art, the display panel of the present disclosure ensures light passing through the complex sheet 200 is sufficiently diffused based on its structure characteristics, and thus the complex sheet 200 can be attached directly without needing to be spaced from the panel layer 100.

Meanwhile, as will be described below, the case 400 may include at least one of a case top 410, a guide panel 420, and a cover bottom 430. Since an optical sheet layer and a diffusing plate included in the conventional display panel are thick and heavy, the case forming an exterior appearance of the display panel had to support the diffusing plate in a vertical direction. For example, it was a general structure in that the guide panel has a protrusion protruding in a horizontal direction or a horizontal portion, and the optical sheet or the diffusing plate is supported in a vertical direction by the protrusion or the horizontal portion. When the conventional display panel is exposed to a high temperature or low temperature environment, the display panel, the optical sheet layer, and the diffusing plate either contract or expand. There was a problem in that luminance of light is reduced since the degree of contraction or expansion of the display panel is different from the degree of contraction or expansion of the optical sheet layer or the diffusing plate. In addition, there was a problem in that the diffusing plate was damaged due to rubbing phenomenon caused by contraction and expansion at a portion where the diffusing plate and the case are in contact with each other in order for the diffusing plate to be supported by the case.

According to the present disclosure, the complex sheet 200 may be directly attached to the panel layer 100. Accordingly, the complex sheet 200 may be configured to be in non-contact with the case 400. That is, the complex sheet 200 does not contact the case 400. Even when the display panel is exposed to a high temperature or low temperature environment, the degree of contraction or expansion of the panel layer 100 is the same as the degree of contraction or expansion of the complex sheet 200, and thus the problem of reducing of luminance can be reduced or prevented. In addition, since the complex sheet 200 according to the present disclosure may not be supported by the case 400, rubbing with the case 400 does not occur when the complex sheet 200 contracts or expands.

The backlight driver 300 may include a lens 310, a light source module 320, a backlight circuit unit 330, and a reflector 340.

Each of the light source modules 320 is arranged side by side so as to be spaced apart from each other. The light source module 320 irradiates light to a lower surface of the panel layer 100. Each of the light source modules 320 may emit light simultaneously or individually according to a light source driving signal output from the backlight driver 330. For example, the light source module 320 may use local dimming to partially control luminance. According to an example, the light source module 320 may be formed of a chip scale package and may be directly mounted on an upper surface of the backlight circuit unit 330.

The lens 310 may be disposed on the light source module 320 and thus may diffuse light incident from the light source module 320. The lens 310 may be formed as an aspherical surface and thus may have optical axis asymmetry. The lens 310 may prevent or at least reduce aberration by having the aspherical surface. For example, the lens 310 may be configured to prevent or at least reduce hot spots and to diffuse light by having an upper surface formed in an elliptical shape and a central portion of a lower surface formed in a cone shape.

The reflector 340 is disposed under the light source module 320 and may be formed of a material having reflective properties. A portion of the light emitted from the light source module 320 may travel in a downward direction, and the reflector 340 may reflect such light in an upward direction.

The case 400 may include a case top 410, a guide panel 420, and a cover bottom 430. The cover bottom 430 may define a lower exterior appearance of the display panel. The cover bottom 430 may accommodate the backlight circuit unit 330 at an upper portion thereof. The guide panel 420 may be coupled to a side surface of the cover bottom 430. The case top 410 may define a side exterior appearance of the display panel. The case top 410 may be coupled to a side surface of the guide panel 420. The case top 410 may partially cover an upper portion of the panel layer 100. To this end, an adhesive member 150 may be interposed between the case top 410 and the panel layer 100.

The case 400 according to the present disclosure is non-contact with the complex sheet 200 as described above. That is, the case 400 may not have a configuration for supporting the complex sheet 200. For example, the guide panel of the conventional display panel, which has the horizontal portion or the protrusion to support the panel layer, may be omitted. For another example, the guide panel 420 according to the present disclosure may not include the horizontal portion or the protrusion for supporting the panel layer 100.

Figure 4:
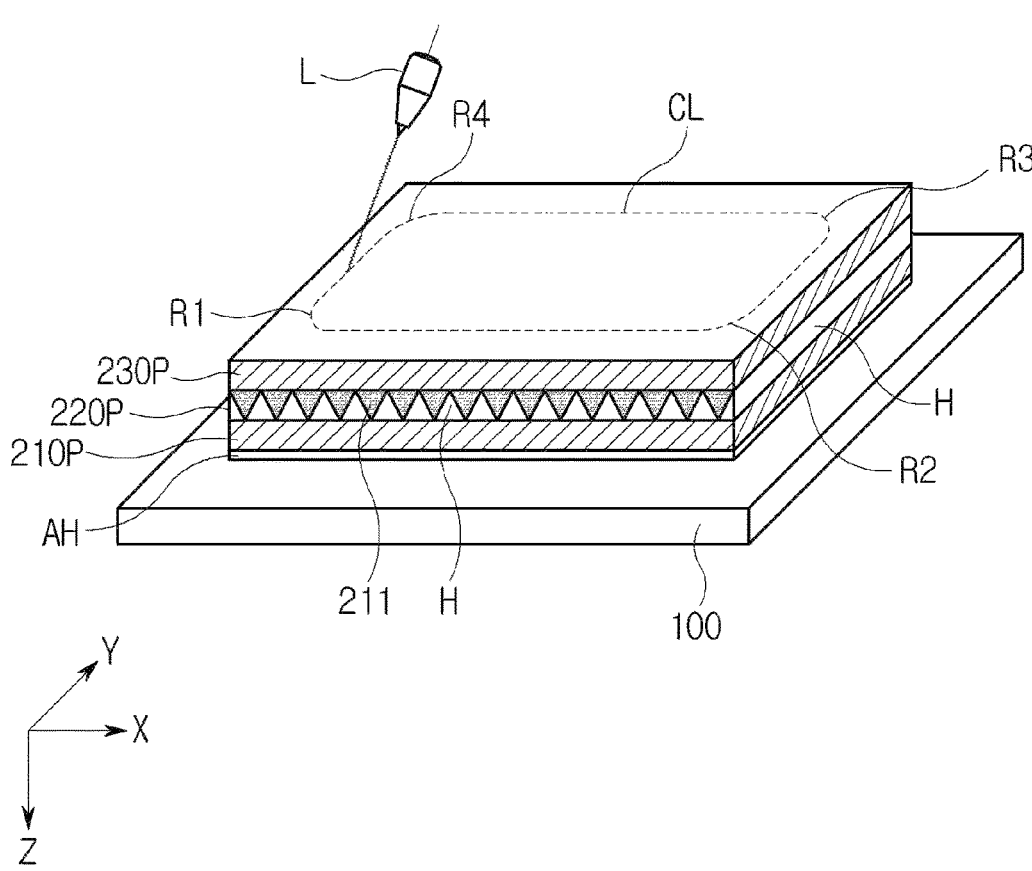
FIGS. 4 to 6 are views explaining a method for producing a complex sheet according to an embodiment of the present disclosure.
Figure 5:
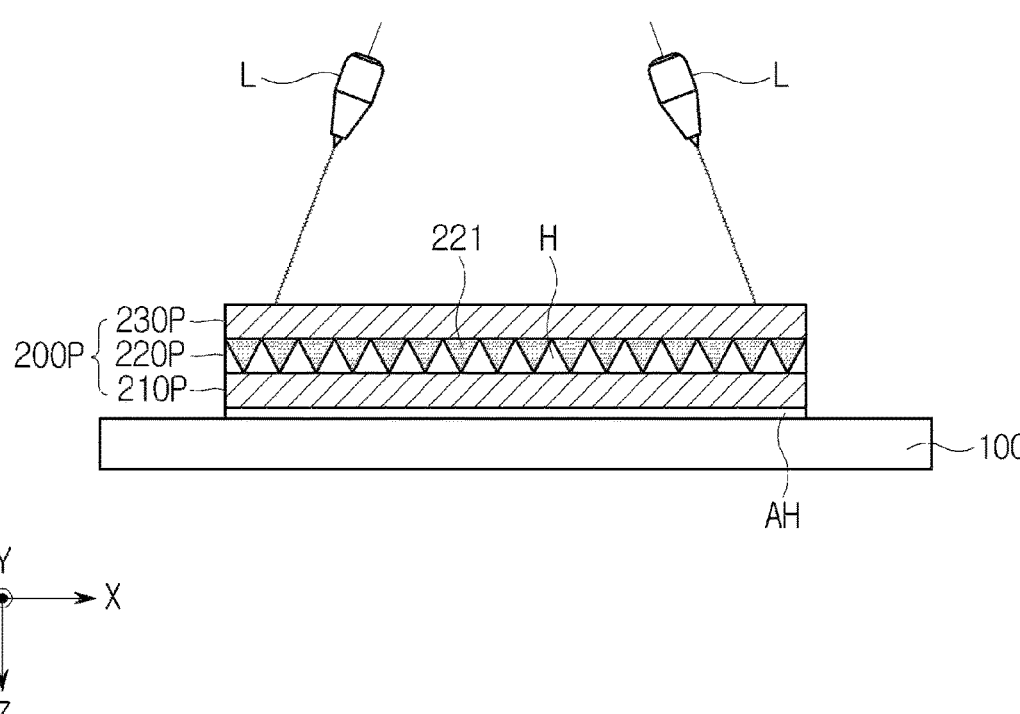
Figure 6:
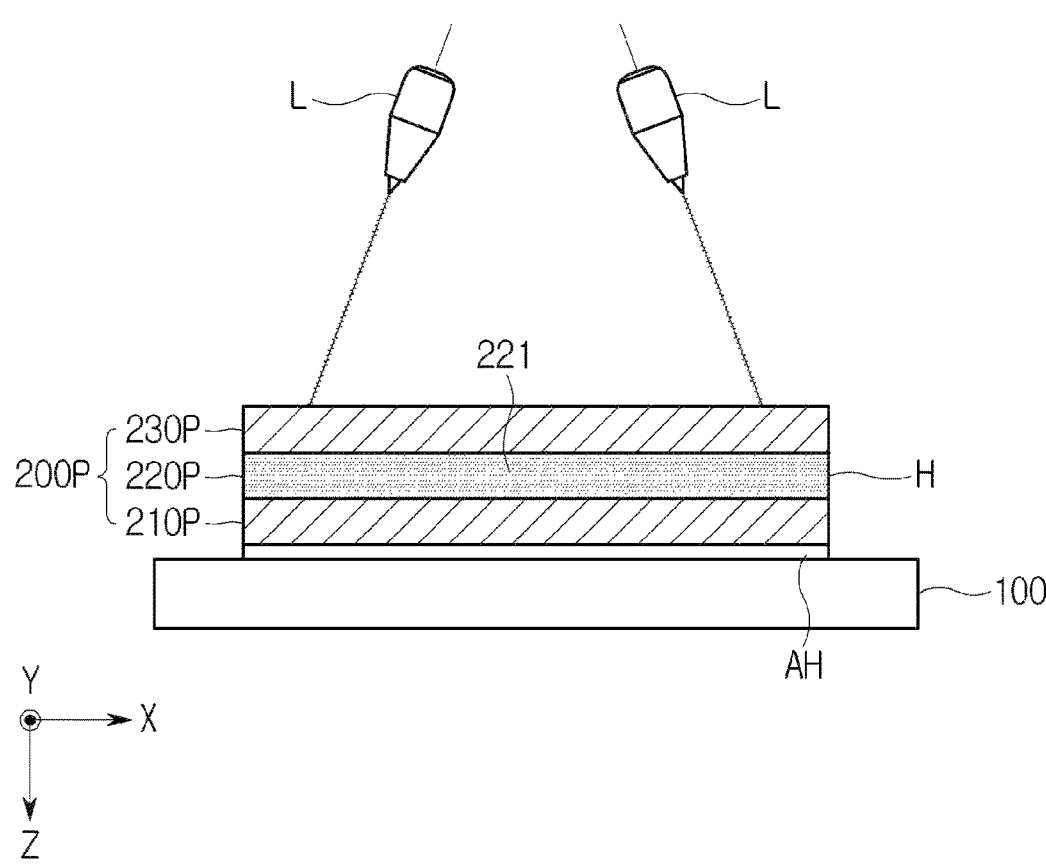

FIGS. 4 to 6 are views for explaining a method for producing a complex sheet according to an embodiment of the present disclosure. Specifically, FIG. 4 is a perspective view of producing a complex sheet according to an embodiment of the present disclosure, FIG. 5 is a plan view viewed from a X-Z plane when producing the complex sheet according to an embodiment of the present disclosure, and FIG. 6 is a plan view viewed from a Y-Z plane when producing the complex sheet according to an embodiment of the present disclosure.

A method for producing a complex sheet according to an embodiment of the present disclosure will be described with reference to FIGS. 4 to 6.

First, referring to FIG. 4, a complex sheet 200P including a first support layer 210P, a light refracting layer 220P and a second support layer 230P may be attached on a rear surface of the panel layer 100.

Specifically, the first support layer 210P may be a layer of planar shape including a first material. For example, the first material may be a PET material.

The light refracting layer 220P may be formed on the first support layer 210P. The light refracting layer 220P may include a plurality of light refracting elements 221 and may be a layer of planar shape. For example, the light refracting element 221 may be a prism. The light refracting layer 220P may be formed of a second material. That is, the light refracting element 221 may be formed of the second material. That is, the prism 221 may be formed of the second material.

The second support layer 230P may be formed on the light refracting layer 220P. The second support layer 230P may be a layer of planar shape including the first material. For example, the first material may be a PET material.

The complex sheet 200P formed as such may have a space H exposed at the side surface thereof. When it is exemplarily described that the light refracting element is the prism 221, there may be a space H not filled with the second material between a certain prism 221 and a prism 221 adjacent to the certain prism 221, and this space H may be exposed at the side surface of the complex sheet 200P. As described above, this space H may cause a problem in that moisture penetrates therein.

The complex sheet 200P formed as described above may be attached on the rear surface of the panel layer 100. The rear surface refers to a downward direction of the display panel, and may be in the −Z axis direction with reference to FIG. 4. For example, the complex sheet 200P may be interposed on the adhesive layer AH applied on the rear surface of the panel layer 100, and the adhesive layer AH may be cured. The adhesive layer AH may be an OCA or PSA material.

By irradiating a laser beam L penetrating the second support layer 230P, the light refracting layer 220P and the first support layer 210P, the complex sheet 200P may be inclinedly cut. Referring to FIG. 4, the laser beam L may be irradiated above the complex sheet 200P and move along a cutting line CL. Referring to FIGS. 5 and 6, the laser beam L may irradiate light in a state inclined at a predetermined angle with respect to a vertical direction (Z axis). The irradiated light may have a wavelength capable of melting the second support layer 230P, the light refracting layer 220P, and the first support layer 210P. In addition, since the laser beam L is inclined at the predetermined angle, the cross-section of the cut complex sheet 200P may have an inclined portion inclined with respect to the vertical direction (Z axis). In one embodiment, the predetermined angle is greater than 0 degrees and less 90 degrees with respect to the X axis.

Figure 7:
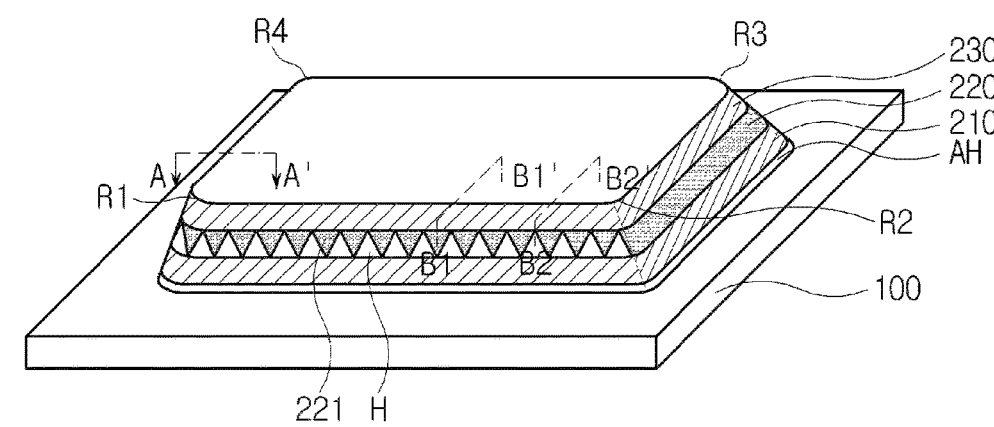
FIG. 7 is a perspective view showing the complex sheet according to an embodiment of the present disclosure.
Figure 7:
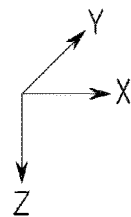

In the above inclinedly cutting step, at least one layer of the second support layer 230P, the light refracting layer 220P and the first support layer 210P may be melted, and the side cover may be formed by the melting (see 270 in FIG. 7, etc.). According to the present disclosure, the step of cutting inclinedly may have the following technical significance. The complex sheet 200 according to the present disclosure may have the inclined portion S at an edge portion thereof, as described above with reference to FIGS. 2 to 3. As will be described below with reference to FIG. 7, etc., the side cover 270 formed on the inclined portion S may include a first extension material formed by extending the first material of the first support layer 210P by melting, a second extension material formed by extending the second material of the light refracting layer 220P by melting, and a third extension material formed by extending the first material of the second support layer 230P by melting. The molten first extension material, second extension material or third extension material may form the side cover by being cured while flowing down the inclined surface. The side cover formed in this way may serve to close the space H exposed at the side surface of the complex sheet 200P. Unlike presented in the present disclosure, when performing cutting vertically such as by irradiating the laser beam L in the vertical direction (Z-axis direction), the complex sheet 200P will merely be divided into left and right with respect to the vertical plane to which the laser beam L is irradiated, and the first extending material, the second extending material or the third extending material, which are to be formed on the inclined portion S, will not be formed thereon. In addition, unlike what is suggested in the present disclosure, when the vertical cutting is performed using the laser beam L, the molten first extension material or second extension material may fall down by gravity and be deposited only on the first support layer 210P and not be deposited on the light refracting layer 220P. Therefore, the space exposed at the side surface of the complex sheet 200P may not be properly closed. According to the present disclosure, by inclinedly cutting the complex sheet 200P, the side cover capable of closing all of the spaces H can be formed.

Also, referring to FIG. 4, the side cover may be formed to form a closed loop along the periphery of the complex sheet 200P. That is, the laser beam L may move along the cutting line CL forming a closed loop along the periphery of the complex sheet 200P, and accordingly the side cover may be formed to form a closed loop along the periphery of the complex sheet 200P. As a result, the space H that was exposed at the side surface of the complex sheet 200P can be all closed or covered.

In addition, referring to FIG. 4, the side cover may be formed such that rounds R1, R2, R3, R4 are formed at the corners of the complex sheet 200P. That is, the laser beam L may move along the cutting line CL drawing the rounds R1, R2, R3, R4 at the four corners on the plane of the complex sheet 200P. According to the present disclosure, the formation of the round at the corner of the complex sheet 200P may have the following technical significance. When the laser beam L does not move with drawing the round at the corner, the complex sheet 200P receive the laser beam twice at the corner. For example, when the laser beam L moves in a counterclockwise direction, the corner R1 receives the laser beam once in the −Y-axis direction, and receives the laser beam once again in the X-axis direction. Receiving of the laser beam twice may equally occur in the remaining corners R2, R3, R4. Accordingly, the panel layer 100 interposed under the complex sheet 200P is irradiated with laser beam twice in the corner. There may occur a problem in that the panel layer 100 is damaged by the multiple laser beam irradiation. In addition, since melting occurs twice at the corner of the complex sheet 200P, the side cover may be irregularly formed. According to the present disclosure, by forming the side cover in a way that the rounds R1, R2, R3, R4 are formed at the corners of the complex sheet 200P, damage to the panel layer 100 can be reduced or prevented, and the problem that the side cover is irregularly formed can be prevented.

Figure 8:
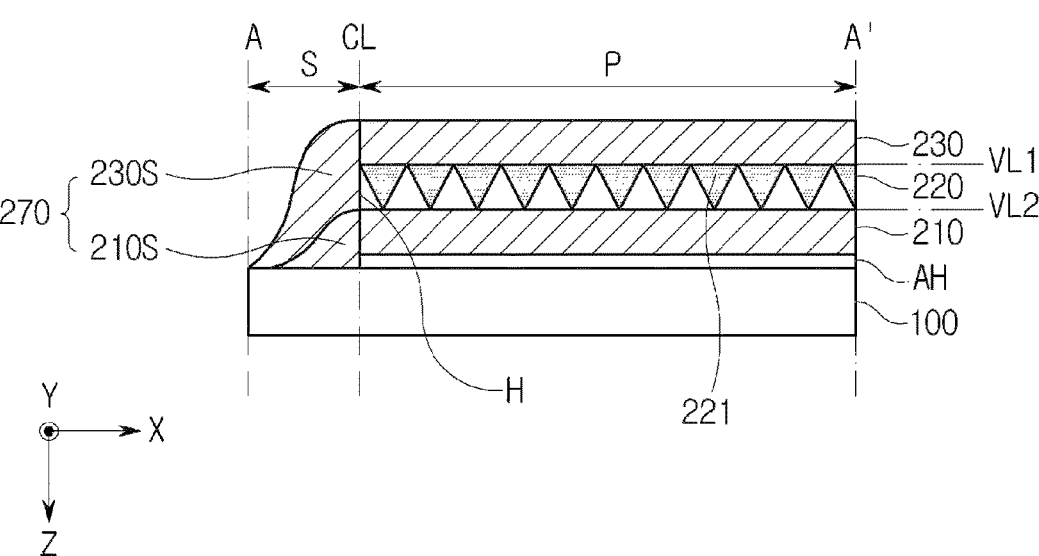
FIGS. 8 to 10 are cross-sectional views taken along the cut line A-A' in the complex sheet of FIG. 7.
Figure 9:
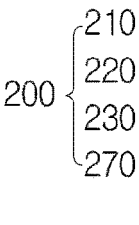
Figure 9:
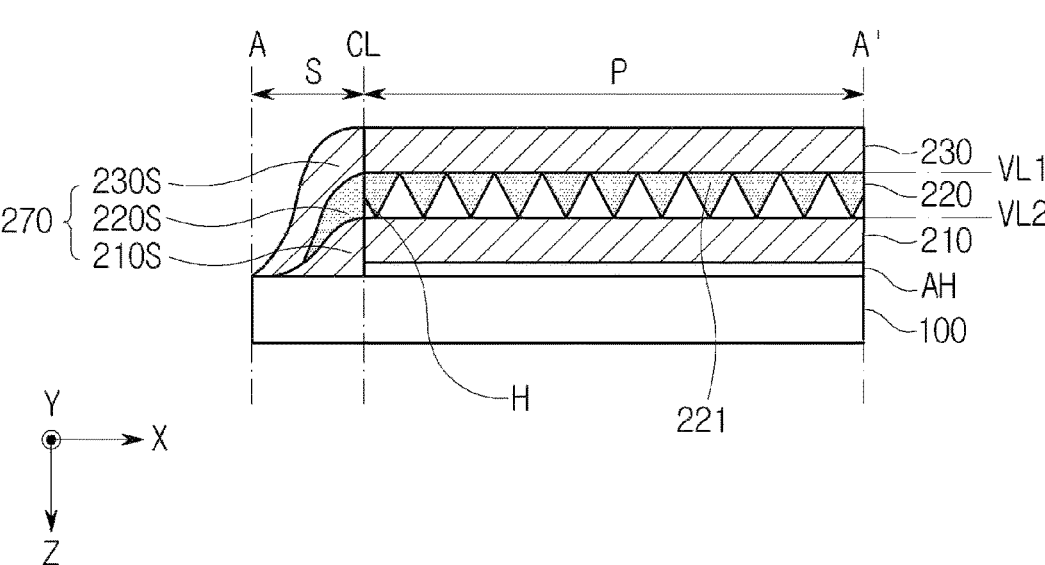
Figure 10:
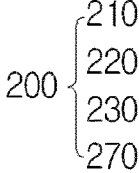
Figure 10:
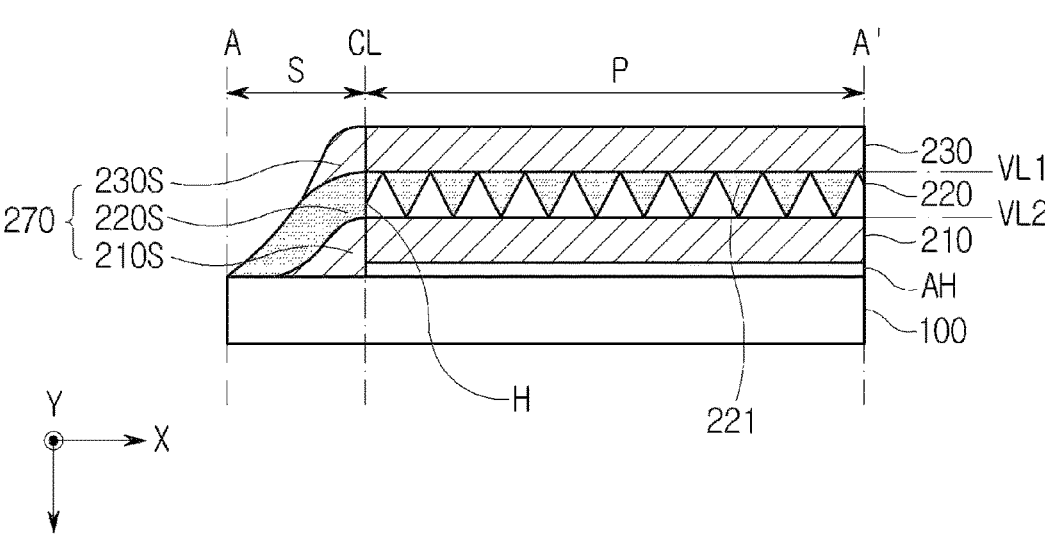
Figure 11:
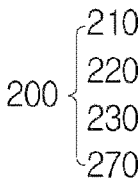
FIG. 11 is a cross-sectional view taken along the cut line B1-B1' in the complex sheet of FIG. 7 according to an embodiment of the present disclosure.
Figure 11:
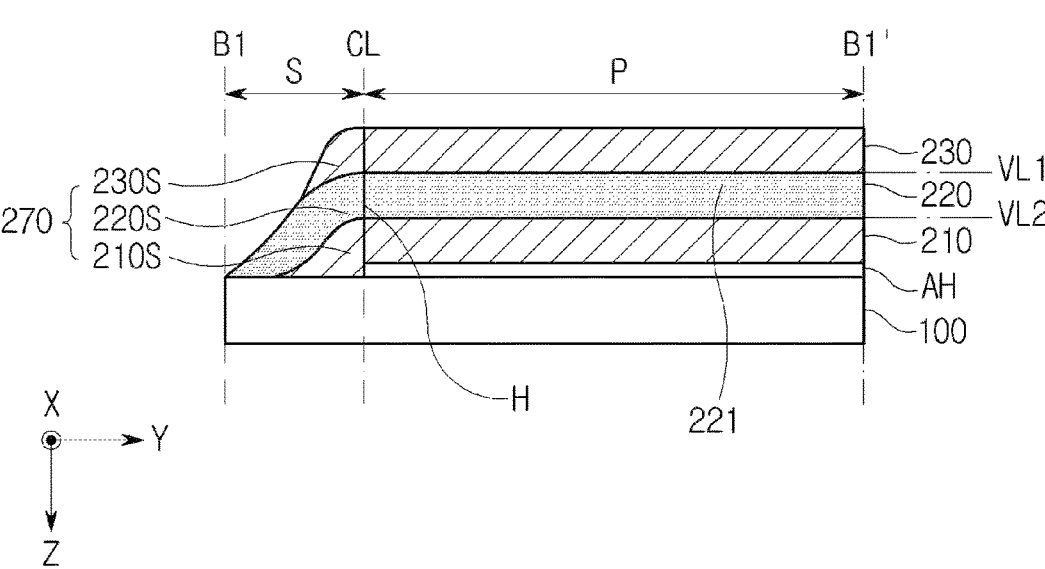
Figure 12:
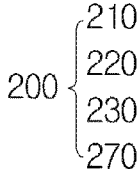
FIG. 12 is a cross-sectional view taken along the cut line B2-B2' in the complex sheet of FIG. 7 according to an embodiment of the present disclosure.
Figure 12:
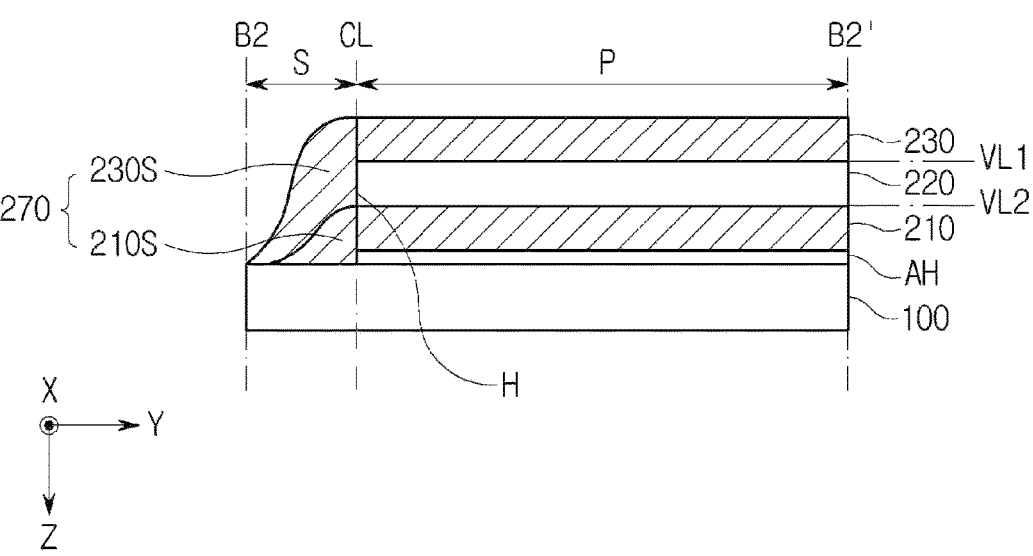

FIG. 7 is a perspective view showing a complex sheet according to an embodiment of the present disclosure. FIGS. 8 to 10 are cross-sectional views taken along the cut line A-A' in the complex sheet of FIG. 7 according to an embodiment of the present disclosure. FIG. 11 is a cross-sectional view taken along the cut line B1-B1' in the complex sheet of FIG. 7 according to an embodiment of the present disclosure. FIG. 12 is a cross-sectional view taken along the cut line B2-B2' in the complex sheet of FIG. 7 according to an embodiment of the present disclosure.

A complex sheet according to an embodiment of the present disclosure will be described with reference to FIGS. 7 to 12.

A complex sheet 200 may include a first support layer 210, a light refracting layer 220, a second support layer 230, and a side cover 270. FIG. 7 is a perspective view, and the side cover 270 formed to surround an outer peripheral surface of the complex sheet 200 is omitted. The side cover 270 will be described with reference to FIGS. 8 to 12.

The first support layer 210 may be formed on a rear surface of the panel layer 100. The rear surface refers to a downward direction of the display panel 100, and may be in the −Z axis direction with reference to FIG. 7. The first support layer 210 may be attached to the rear surface of the panel layer 100 through an adhesive layer AH. The adhesive layer AH may be a transparent material as a PSA or OCA.

The first support layer 210 may be formed of a first material. The first material may be PET.

The light refracting layer 220 may be formed on a rear surface of the first support layer 210. The light refracting layer 220 may refract light emitted from a lower light source module and diffuse the light upwards. The light refracting layer 220 may include a plurality of prisms 221 arranged at regular intervals. The light refracting layer 200 may be formed of a second material. That is, the plurality of prisms 221 may be formed of the second material. For example, the second material may be a transparent material such as glass or plastic. The first material and the second material may be the same material or different materials.

The second support layer 230 may be formed on a rear surface of the light refracting layer 220. The second support layer 230 may be formed of the first material that is the same material as that of the first support layer 210. That is, the second support layer 230 may be formed of a PET material.

As shown in FIGS. 8 to 12, the complex sheet 200 may include an inclined portion S and a planar portion P. The side cover 270 may be formed on the inclined portion S. The inclined portion S may be formed along the outer peripheral surface of the complex sheet 200. The inclined portion S may be formed in a closed loop shape around a periphery of the complex sheet 200. The planar portion P may be a portion other than the inclined portion S of the complex sheet 200, and may be a planar portion extending horizontally with respect to the X-Y plane. The inclined portion S of the complex sheet 200 may have a reversed taper shape in the Z-axis direction. That is, a width of the upper surface of the complex sheet 200 (the surface in contact with the panel layer 100) may be longer than a width of the lower surface. This side cover 270 may close all of the space H exposed to the outside along the periphery of the complex sheet 200. This will be described below with reference to FIGS. 8 to 12.

Referring back to FIG. 7, the side cover 270 may have the round shapes R1, R2, R3, R4 at the corners of the complex sheet 200. Since the side cover 270 has the round shapes R1, R2, R3, R4, the problem of damage to the panel layer 100, which may occur in the laser beam cutting process, can be reduced or prevented. Further, the surface irregularity problem, which may occur in the laser beam cutting process, can be prevented by the side cover 270 having the round shapes R1, R2, R3, R4.

FIGS. 8 to 10 are cross-sectional views taken along the cut line A-A' in the complex sheet of FIG. 7 according to various embodiments. FIG. 11 is a cross-sectional view taken along the cut line B1-B1' in the complex sheet of FIG. 7 according to one embodiment. FIG. 12 is a cross-sectional view taken along the cut line B2-B2' in the complex sheet of FIG. 7 according to one embodiment. In the description of FIGS. 8 to 12, the description repeated with the above description will be omitted.

Referring to FIG. 8, the complex sheet 200 attached to the rear surface of the panel layer 100 by the adhesive layer AH is shown. The complex sheet 200 may include the planar portion P and the inclined portion S. The complex sheet 200 may include in the planar portion P the first support layer 210 formed on the rear surface of the panel layer 100 and formed of the first material, the light refracting layer 220 formed on the rear surface of the first support layer 210 and formed of the second material, and the second support layer 230 formed on the rear surface of the light refracting layer 220 and formed of the first material. The complex sheet 200 may further include the side cover 270 formed on the inclined portion S. The side cover 270 may include a first extension material 210S and a third extension material 230S. The first extension material 210S may be a material formed in a way that the material of the first support layer 210 is melted and extends toward the inclined portion S. The first extension material 210S may be the first material constituting the first support layer 210. The third extension material 230S may be a material formed in a way that the material of the second support layer 230 is melted and extends toward the inclined portion S. The third extension material 230S may be the first material constituting the second support layer 230. The space H formed at the side surface of the complex sheet 200 may be all closed by the side cover 270 formed in this manner Since the side cover 270 is formed in the shape of a closed loop along the periphery of the side surface of the complex sheet 200, the complex sheet 200 can be completely sealed. Therefore, any inflow of moisture that can penetrate through the space H can be completely blocked.

Meanwhile, in the cross-sectional view shown in FIG. 8, the second material constituting the light refracting layer 220 may not be melted. For example, the cutting line CL by the laser beam may be formed so as not to pass through the prism 221. For another example, the laser beam may have a wavelength that melts only the support layers 210 and 230 without melting the prism 221. Accordingly, the side cover 270 may include the third extension material 230S formed to invade the light refracting layer 220 and the first support layer 210. That is, when a virtual line VL1 between the second support layer 230 and the light refracting layer 220 is assumed and a virtual line VL2 between the light refracting layer 220 and the first support layer 210 is assumed, the third extension material 230S may be formed to invade (e.g., cross) the virtual line VL1 and the virtual line VL2.

Referring to FIG. 9, the complex sheet 200 attached to the rear surface of the panel layer 100 by the adhesive layer AH is shown. The complex sheet 200 may include the planar portion P and the inclined portion S. The complex sheet 200 may include in the planar portion P the first support layer 210 formed on the rear surface of the panel layer 100 and formed of the first material, the light refracting layer 220 formed on the rear surface of the first support layer 210 and formed of the second material, and the second support layer 230 formed on the rear surface of the light refracting layer 220 and formed of the first material. The complex sheet 200 may further include the side cover 270 formed on the inclined portion S. The side cover 270 may include a first extension material 210S, a second extension material 220S and a third extension material 230S. The first extension material 210S may be a material formed in a way that the material of the first support layer 210 is melted and extends toward the inclined portion S. The first extension material 210S may be the first material constituting the first support layer 210. The second extension material 220S may be a material formed in a way that the material of the light refracting layer 220 is melted and extends toward the inclined portion S. The second extension material 220S may be the second material constituting the light refracting layer 220 or the prism 221. The third extension material 230S may be a material formed in a way that the material of the second support layer 230 is melted and extends toward the inclined portion S. The third extension material 230S may be the first material constituting the second support layer 230. The space H formed at the side surface of the complex sheet 200 may be all closed by the side cover 270 formed in this way. Since the side cover 270 is formed in the shape of a closed loop along the periphery of the side surface of the complex sheet 200, the complex sheet 200 can be completely sealed. Therefore, any inflow of moisture that can penetrate through the space H can be completely blocked.

Meanwhile, in the cross-sectional view shown in FIG. 9, the second material constituting the light refracting layer 220 may be melted relatively less compared to the cross-sectional view of FIG. 10, which will be described below. For example, the cutting line CL by the laser beam may be formed such that a small portion of the prism 221 remains on the inclined portion S and a large portion of the prism 221 remains on the planar portion P. Accordingly, the side cover 270 may include the third extension material 230S formed to invade (e.g., cross) the light refracting layer 220 and the first support layer 210, and the second extension material 220S formed to invade the first support layer 210. That is, when the virtual line VL1 between the second support layer 230 and the light refracting layer 220 is assumed and the virtual line VL2 between the light refracting layer 220 and the first support layer 210 is assumed, the third extension material 230S may be formed to invade (e.g., cross) the virtual line VL1 and the virtual line VL2. Also, the second extension material 220S may be formed to invade the virtual line VL2.

Referring to FIG. 10, the complex sheet 200 attached to the rear surface of the panel layer 100 by the adhesive layer AH is shown. The complex sheet 200 may include the planar portion P and the inclined portion S. The complex sheet 200 may include in the planar portion P the first support layer 210 formed on the rear surface of the panel layer 100 and formed of the first material, the light refracting layer 220 formed on the rear surface of the first support layer 210 and formed of the second material, and the second support layer 230 formed on the rear surface of the light refracting layer 220 and formed of the first material. The complex sheet 200 may further include the side cover 270 formed on the inclined portion S. The side cover 270 may include a first extension material 210S, a second extension material 220S and a third extension material 230S. The first extension material 210S may be a material formed in a way that the material of the first support layer 210 is melted and extends toward the inclined portion S. The first extension material 210S may be the first material constituting the first support layer 210. The second extension material 220S may be a material formed in a way that the material of the light refracting layer 220 is melted and extends toward the inclined portion S. The second extension material 220S may be the second material constituting the light refracting layer 220 or the prism 221. The third extension material 230S may be a material formed in a way that the material of the second support layer 230 is melted and extends toward the inclined portion S. The third extension material 230S may be the first material constituting the second support layer 230. The space H formed at the side surface of the complex sheet 200 may be all closed by the side cover 270 formed in this way. Since the side cover 270 is formed in the shape of a closed loop along the periphery of the side surface of the complex sheet 200, the complex sheet 200 can be completely sealed. Therefore, any inflow of moisture that can penetrate through the space H can be completely blocked.

Meanwhile, in the cross-sectional view shown in FIG. 10, the second material constituting the light refracting layer 220 may be melted more compared to the cross-sectional view of FIG. 9. For example, the cutting line CL by the laser beam may be formed such that a large portion of the prism 221 remains on the inclined portion S and a small portion of the prism 221 remains on the planar portion P. Accordingly, the side cover 270 may include the third extension material 230S formed to invade the light refracting layer 220 and the second extension material 220S formed to invade the first support layer 210. Compared with the cross-sectional view of FIG. 9, the third extension material 230S is different in that it does not invade (e.g., cross) the first support layer 210. That is, in FIG. 10, a relatively larger amount of the second material is melted compared to FIG. 9, and thus the second extension material 220S may be formed more widely, and accordingly, the third extension material 230S may be formed up to the upper portion of the material 220S such that the second extension material 220S is between the first extension material 210S and the third extension material 230S.

That is, when the virtual line VL1 between the second support layer 230 and the light refracting layer 220 is assumed and the virtual line VL2 between the light refracting layer 220 and the first support layer 210 is assumed, the third extension material 230S may be formed to invade the virtual line VL1 but not the virtual line VL2. Also, the second extension material 220S may be formed to invade the virtual line VL2. That is, the third extension material 230S may be formed so as not to invade the virtual line VL2.

Referring to FIG. 11, the complex sheet 200 attached to the rear surface of the panel layer 100 by the adhesive layer AH is shown. The complex sheet 200 may include the planar portion P and the inclined portion S. The complex sheet 200 may include in the planar portion P the first support layer 210 formed on the rear surface of the panel layer 100 and formed of the first material, the light refracting layer 220 formed on the rear surface of the first support layer 210 and formed of the second material, and the second support layer 230 formed on the rear surface of the light refracting layer 220 and formed of the first material. The complex sheet 200 may further include the side cover 270 formed on the inclined portion S. The side cover 270 may include a first extension material 210S, a second extension material 220S and a third extension material 230S. The first extension material 210S may be a material formed in a way that the material of the first support layer 210 is melted and extends toward the inclined portion S. The first extension material 210S may be the first material constituting the first support layer 210. The second extension material 220S may be a material formed in a way that the material of the light refracting layer 220 is melted and extends toward the inclined portion S. The second extension material 220S may be the second material constituting the light refracting layer 220 or the prism 221. The third extension material 230S may be a material formed in a way that the material of the second support layer 230 is melted and extends toward the inclined portion S. The third extension material 230S may be the first material constituting the second support layer 230. The space H formed at the side surface of the complex sheet 200 may be all closed by the side cover 270 formed in this way. Since the side cover 270 is formed in the shape of a closed loop along the periphery of the side surface of the complex sheet 200, the complex sheet 200 can be completely sealed. Therefore, any inflow of moisture that can penetrate through the space H can be completely blocked.

Meanwhile, since the cross-sectional view shown in FIG. 11 is a cross-sectional view in the direction B1-B1' of FIG. 7, the prism 221 is interposed over the entire cross-section of the second refractive layer 220. That is, the cross section of the second refractive layer 220 in the planar portion P may entirely include the prism 221. Accordingly, the cross-section of the inclined portion S may be the same as or similar to the cross-section of FIG. 10. The cutting line CL by the laser beam may be formed to pass through all portions of the prism 221. Accordingly, the side cover 270 may include the third extension material 230S formed to invade the light refracting layer 220 and the second extension material 220S formed to invade the first support layer 210. That is, the third extension material 230S may be formed only up to the upper portion of the second extension material 220S. When the virtual line VL1 between the second support layer 230 and the light refracting layer 220 is assumed and the virtual line VL2 between the light refracting layer 220 and the first support layer 210 is assumed, the third extension material 230S may be formed to invade only the virtual line VL1. Also, the second extension material 220S may be formed to invade the virtual line VL2. That is, the third extension material 230S may be formed not to invade the virtual line VL2.

Referring to FIG. 12, the complex sheet 200 attached to the rear surface of the panel layer 100 by the adhesive layer AH is shown. The complex sheet 200 may include the planar portion P and the inclined portion S. The complex sheet 200 may include in the planar portion P the first support layer 210 formed on the rear surface of the panel layer 100 and formed of the first material, the light refracting layer 220 formed on the rear surface of the first support layer 210 and formed of the second material, and the second support layer 230 formed on the rear surface of the light refracting layer 220 and formed of the first material. The complex sheet 200 may further include the side cover 270 formed on the inclined portion S. The side cover 270 may include a first extension material 210S and a third extension material 230S. The first extension material 210S may be a material formed in a way that the material of the first support layer 210 is melted and extends toward the inclined portion S. The first extension material 210S may be the first material constituting the first support layer 210. The third extension material 230S may be a material formed in a way that the material of the second support layer 230 is melted and extends toward the inclined portion S. The third extension material 230S may be the first material constituting the second support layer 230. The space H formed at the side surface of the complex sheet 200 may be all closed by the side cover 270 formed in this way. Since the side cover 270 is formed in the shape of a closed loop along the periphery of the side surface of the complex sheet 200, the complex sheet 200 can be completely sealed. Therefore, any inflow of moisture that can penetrate through the space H can be completely blocked.

Meanwhile, since the cross-sectional view shown in FIG. 12 is a cross-sectional view in the direction B2-B2' of FIG. 7, the prism 221 is not interposed over the entire second refractive layer 220. Accordingly, the cross-section of the inclined portion S may be the same as or similar to the cross-section of FIG. 8. The cutting line CL by the laser beam may be formed so as not to pass through the prism 221. Accordingly, the side cover 270 may include the third extension material 230S formed to invade the light refracting layer 220 and the first support layer 210. That is, the side cover 270 does not include the second extension material in which the second material of the light refracting layer 220 is melted. When the virtual line VL1 between the second support layer 230 and the light refracting layer 220 is assumed and the virtual line VL2 between the light refracting layer 220 and the first support layer 210 is assumed, the third extension material 230S may be formed to invade the virtual line VL1 and the virtual line VL2.

Figure 13:
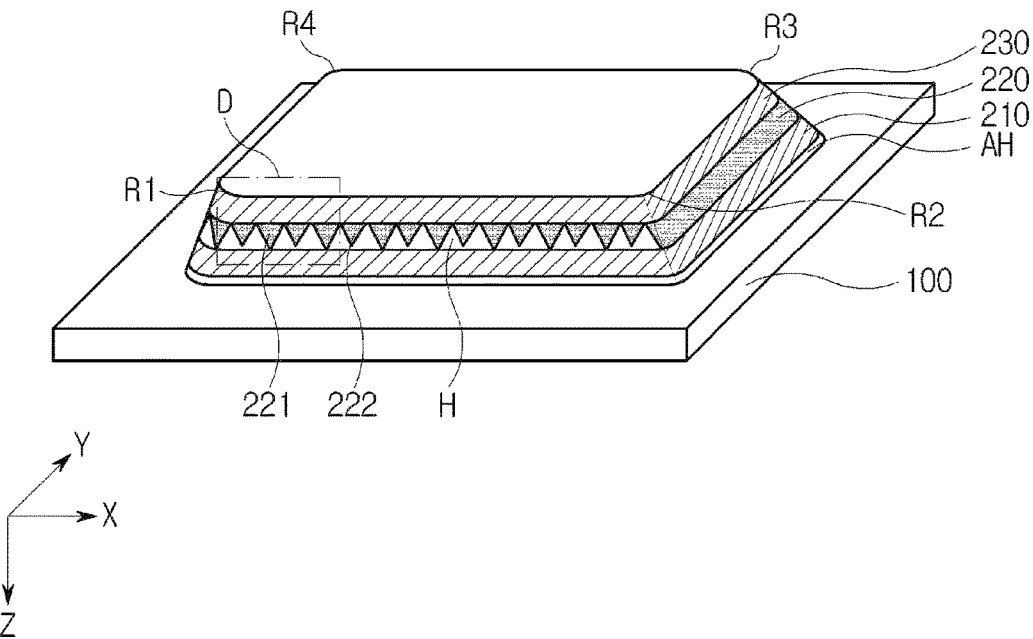
FIG. 13 is a perspective view showing a complex sheet according to another embodiment of the present disclosure.
Figure 14:
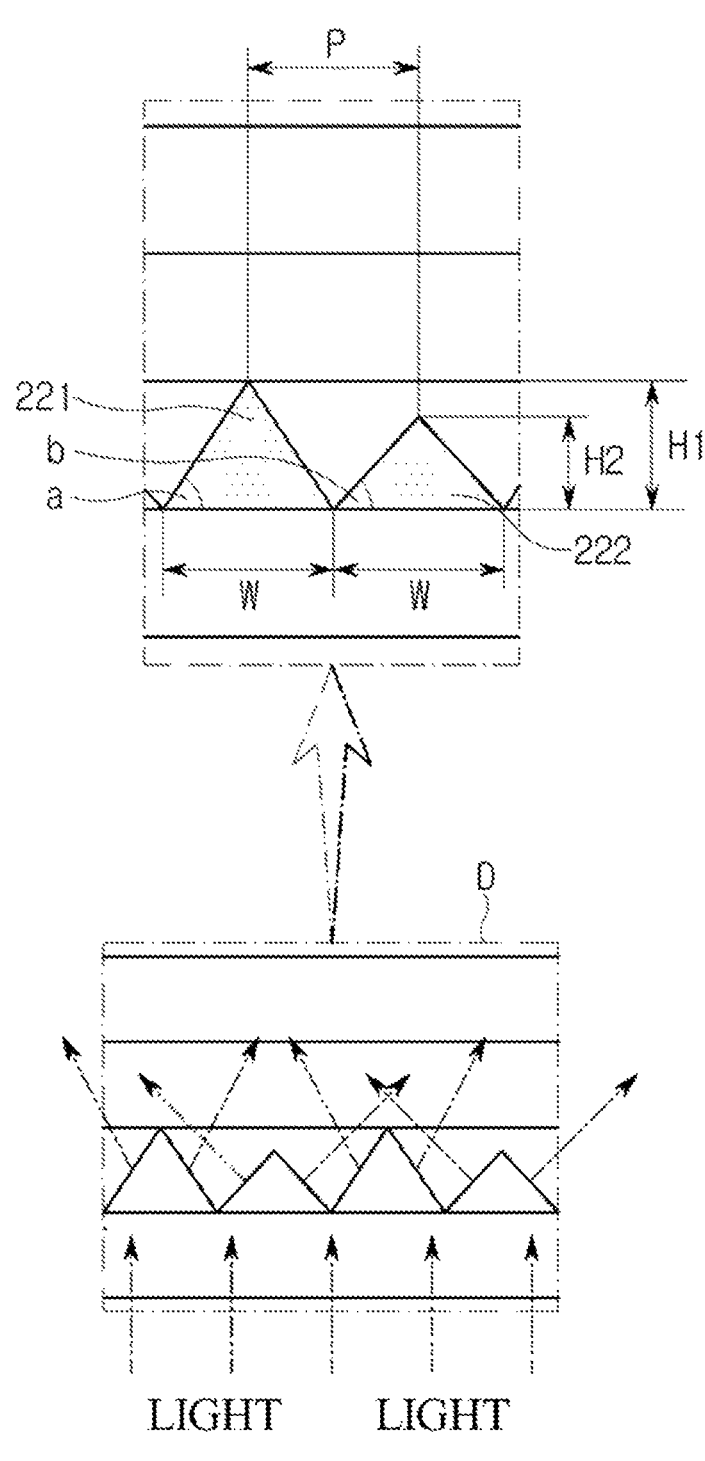
FIG. 14 is an enlarged view of portion D of the complex sheet shown in FIG. 13 according to an embodiment of the present disclosure.
Figure 14:
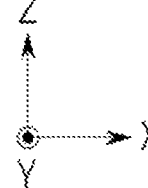

FIG. 13 is a perspective view showing a complex sheet according to another embodiment of the present disclosure. FIG. 14 is an enlarged view of portion D of the complex sheet shown in FIG. 13 according to the other embodiment of the present disclosure.

Another embodiment of the present disclosure will be described with reference to FIGS. 13 and 14.

FIGS. 13 and 14 are different from the embodiment described with reference to FIG. 7 in that the light refracting layer 220 includes hetero prisms 221 and 222. The description repeated with the above-described embodiment will be omitted.

A complex sheet 200 may include a first support layer 210, a light refracting layer 220, and a side cover 270. FIG. 13 is a perspective view, and the side cover 270 formed to surround the outer peripheral surface of the complex sheet 200 is omitted. The side cover 270 will be understood by referring to the description of FIGS. 8 to 12.

The first support layer 210 is formed on a rear surface of the panel layer 100 and may be attached to the rear surface of the panel layer 100 through an adhesive layer AH. The first support layer 210 may be formed of a first material, and the first material may be PET.

The light refracting layer 220 may be formed on a rear surface of the first support layer 210. The light refracting layer 220 may include a plurality of hetero prisms 221 and 222 arranged at regular intervals.

The first prism 221 may have a first height H1. The second prism 222 may have a second height H2. Each of the plurality of prisms 221 and 222 may be spaced apart from each other by a predetermined distance P. For example, the height H1 of the first prism 221 may be 70 µm, and the height of the second prism 222 may be 60 µm. The distance P between the prisms 221 and 222 may be 35 µm.

A width W of the first prism 221 may be the same as a width W of the second prism 222. That is, the first prism 221 may have the first width W, and the second prism 222 may also have the first width W. By way of example, the first width W may be 35 µm. Since the first prism 221 and the second prism 222 have the same width W and different heights H1 and H2, they may have different inclination angles a and b. That is, the inclination angle a of the first prism 221 may be different from the inclination angle b of the second prism 222. Referring to FIG. 14, light traveling from the lower portion to the upper portion is refracted in the horizontal direction while passing through the first prism 221 and the second prism 222. At this time, due to the different inclination angles a and b of the first prism 221 and the second prism 222, the refraction angles of the light passing through the first prism 221 and the light passing through the second prism 222 are different from each other. Accordingly, the diffusion rate of light passing through the complex sheet 200 can be increased.

Figure 15:
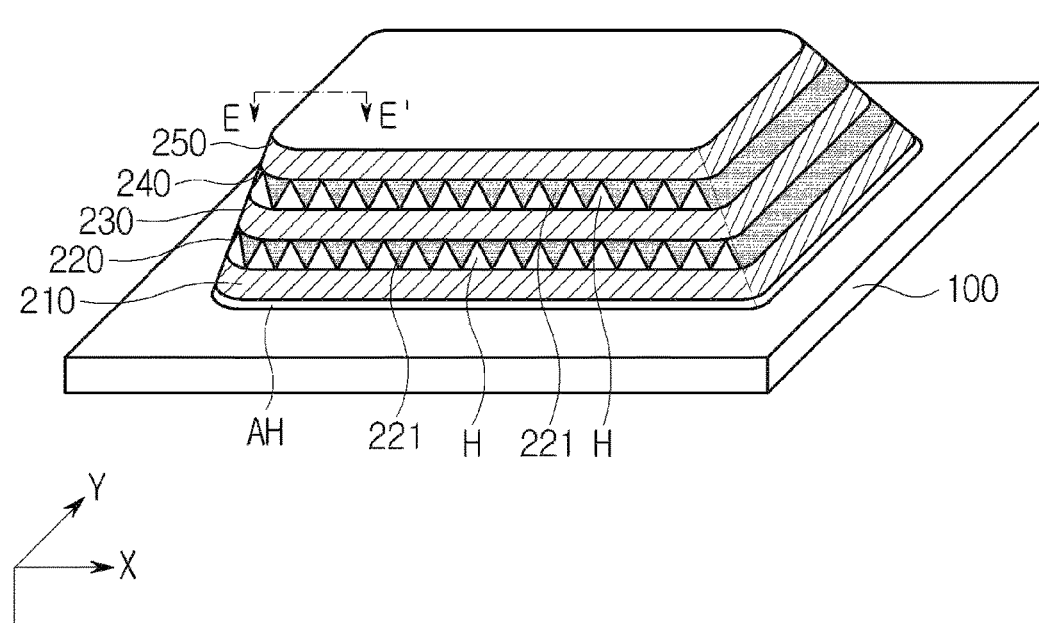
FIG. 15 is a perspective view showing a complex sheet according to another embodiment of the present disclosure.
Figure 16:
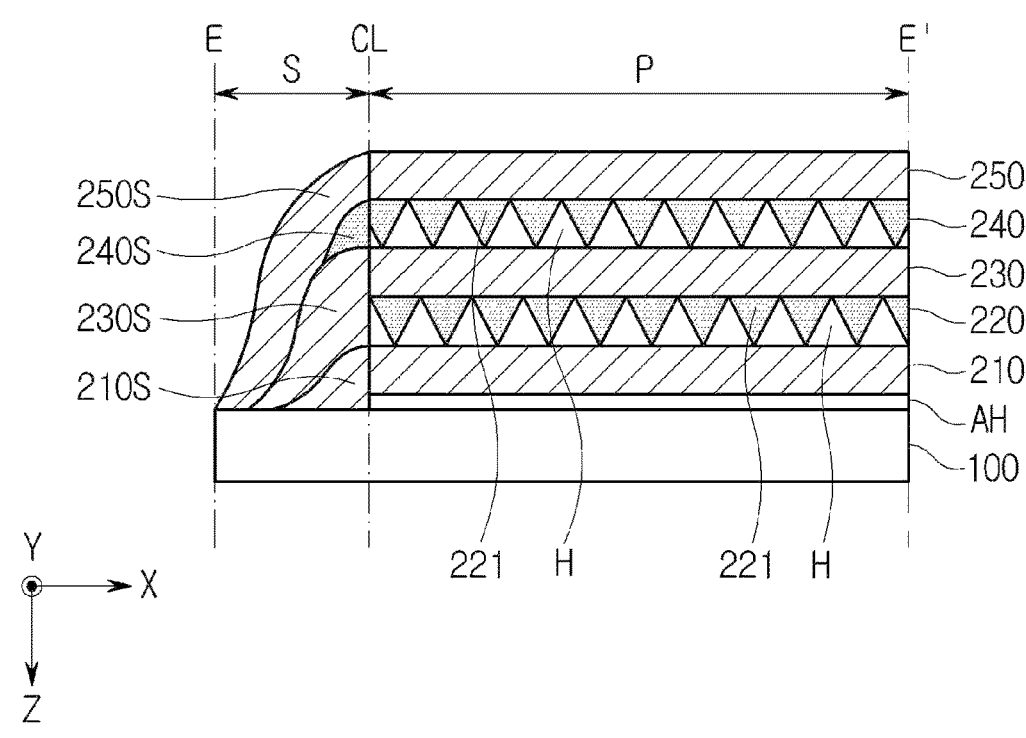
FIG. 16 shows a cross-section in the E-E direction of the complex sheet of FIG. 15 according to an embodiment of the present disclosure.

FIG. 15 is a perspective view showing a complex sheet according to another embodiment of the present disclosure. FIG. 16 shows a cross-section in the E-E' direction of the complex sheet of FIG. 15 according to the other embodiment of the present disclosure.

Another embodiment of the present disclosure will be described with reference to FIGS. 15 and 16. FIG. 15 is a perspective view according to the present embodiment, and the side cover 270 formed to surround the outer peripheral surface of the complex sheet 200 is omitted. The side cover 270 will be understood by referring to the cross-section of FIG. 16.

The first support layer 210 may be formed on a rear surface of the panel layer 100. The rear surface refers to a downward direction of the display panel 100, and may be in the −Z axis direction with reference to FIG. 15. The first support layer 210 may be attached to the rear surface of the panel layer 100 through an adhesive layer AH.

The first support layer 210 may be formed of a first material. The first material may be PET.

The light refracting layer 220 may be formed on a rear surface of the first support layer 210. The light refracting layer 220 may refract and diffuse light traveling in the Z-axis direction. The light refracting layer 220 may include a plurality of prisms 221 arranged at regular intervals. The light refracting layer 220 may be formed of a second material. That is, the plurality of prisms 221 may be formed of the second material. The second material may be glass or plastic, and may be a transparent material. The first material and the second material may be the same material or different materials.

The second support layer 230 may be formed on a rear surface of the light refracting layer 220. The second support layer 230 may be formed of the first material that is the same material as that of the first support layer 210. The second support layer 230 may be formed of a PET material.

The second light refracting layer 240 may be formed on a rear surface of the second support layer 230. The second light refracting layer 240 may include the plurality of prisms 221 arranged at regular intervals. The second light refracting layer 240 may refract and diffuse light traveling in the Z-axis direction. The second light refracting layer 240 may be formed of a second material. That is, the plurality of prisms 221 may be formed of the second material.

The third support layer 250 may be formed on a rear surface of the second light refracting layer 240. The third support layer 250 may be formed of the first material that is the same material as the first support layer 210 and the second support layer 230. The third support layer 250 may be formed of a PET material.

As shown in FIG. 15, the light refracting layer 220 may include the plurality of prisms 221 extending in a Y-axis direction, which is a first direction. The second light refracting layer 240 may include the plurality of prisms 221 also extending in the Y-axis direction, which is the first direction. That is, the plurality of prisms 221 disposed on the light refracting layer 220 may be formed to extend in the same direction as the plurality of prisms 221 disposed on the second light refracting layer 240.

Referring to FIG. 16, the complex sheet 200 may include an inclined portion S and a planar portion P. The side cover 270 may be formed on the inclined portion S. The inclined portion S may be formed along the outer peripheral surface of the complex sheet 200. The inclined portion S may be formed in a closed loop shape. The planar portion P may be a portion other than the inclined portion S of the complex sheet 200, and may be a planar portion extending horizontally with respect to the X-Y plane. The inclined portion S of the complex sheet 200 may have a reversed taper shape in the Z-axis direction. That is, a width of the upper surface of the complex sheet 200 (the surface in contact with the panel layer 100) may be longer than a width of the lower surface. This side cover 270 may close all of a space H exposed to the outside along the periphery of the complex sheet 200.

Referring back to FIG. 15, the side cover 270 may have the round shapes R1, R2, R3, R4 at the corners of the complex sheet 200. Since the side cover 270 has the round shapes R1, R2, R3, R4, the problem of damage to the panel layer 100, which may occur in the laser beam cutting process, can be reduced or prevented. Further, the surface irregularity problem, which may occur in the laser beam cutting process, can be prevented by the side cover 270 having the round shapes R1, R2, R3, R4.

According to the present disclosure, the side cover 270 may include a material formed to extend to the inclined portion S by melting at least one of the first support layer 210, the light refracting layer 220, the second support layer 230, the second light refracting layer 240 and the third support layer 250. FIG. 16 is an exemplary view, in which the side cover 270 is shown to include a first extension material 210S formed in a way that the first support layer 210 is melted and extended, a third extension material 230S formed in a way that the second support layer 230 is melted and extended, a fourth extension material 240S formed in a way that the second light refracting layer 240 is melted and extended, and a fifth extension material 250S formed in a way that the third support layer 250 is melted and extended. However, as described above with reference to FIGS. 8 to 10, the side cover 270 may have a cross-section of a different shape depending on the cutting position and the position of the cutting line by the laser beam, etc.

Figure 17:
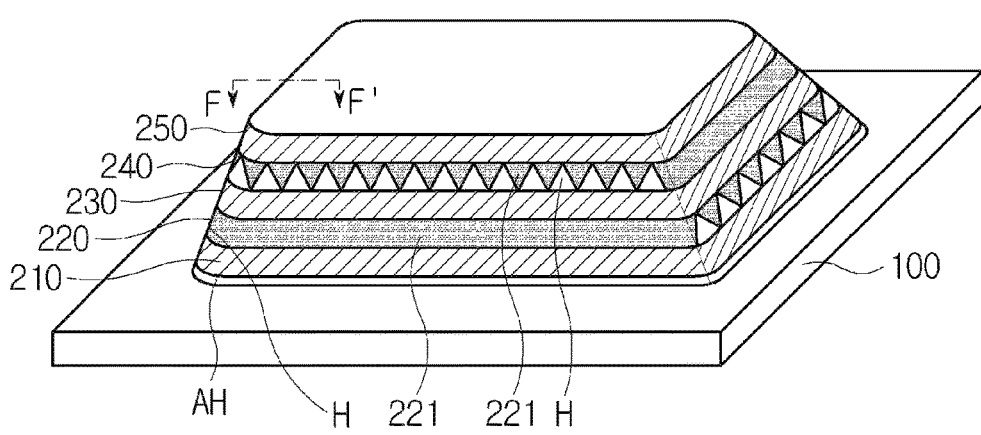
FIG. 17 is a perspective view showing a complex sheet according to another embodiment of the present disclosure.
Figure 17:
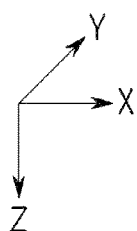
Figure 18:
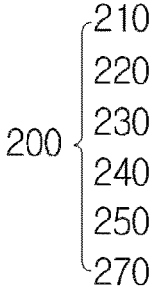
FIG. 18 shows a cross-section in the F-F' direction of the complex sheet of FIG. 17 according to an embodiment of the present disclosure.
Figure 18:
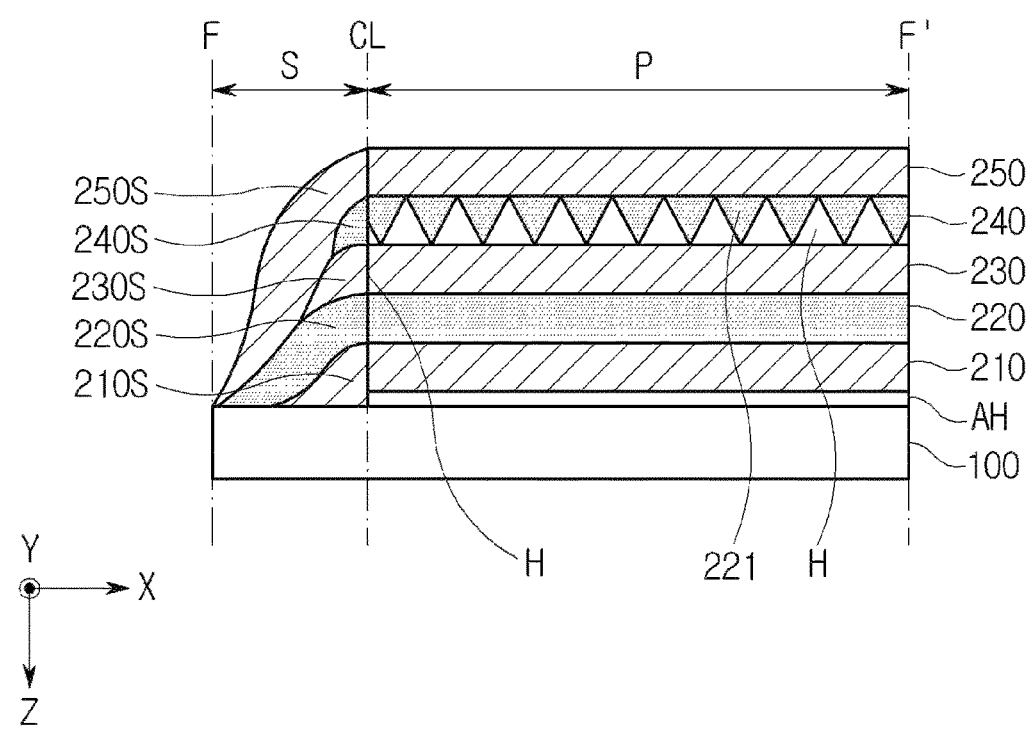

FIG. 17 is a perspective view showing a complex sheet according to another embodiment of the present disclosure. FIG. 18 shows a cross-section in the F-F' direction of the complex sheet of FIG. 17.

Another embodiment of the present disclosure will be described with reference to FIGS. 17 and 18. FIG. 17 is a perspective view according to the present embodiment, and the side cover 270 formed to surround the outer peripheral surface of the complex sheet 200 is omitted. The side cover 270 will be understood by referring to the cross-section of FIG. 18.

The first support layer 210 may be formed on a rear surface of the panel layer 100. The rear surface refers to a downward direction of the display panel 100, and may be in the −Z axis direction with reference to FIG. 17. The first support layer 210 may be attached to the rear surface of the panel layer 100 through an adhesive layer AH.

The first support layer 210 may be formed of a first material. The first material may be PET.

The light refracting layer 220 may be formed on a rear surface of the first support layer 210. The light refracting layer 220 may refract and diffuse light traveling in the Z-axis direction. The light refracting layer 220 may include a plurality of prisms 221 arranged at regular intervals. The light refracting layer 220 may be formed of a second material. That is, the plurality of prisms 221 may be formed of the second material. The second material may be glass or plastic, and may be a transparent material. The first material and the second material may be the same material or different materials.

The second support layer 230 may be formed on a rear surface of the light refracting layer 220. The second support layer 230 may be formed of the first material that is the same material as that of the first support layer 210. The second support layer 230 may be formed of a PET material.

The second light refracting layer 240 may be formed on a rear surface of the second support layer 230. The second light refracting layer 240 may include the plurality of prisms 221 arranged at regular intervals. The second light refracting layer 240 may refract and diffuse light traveling in the Z-axis direction. The second light refracting layer 240 may be formed of a second material. That is, the plurality of prisms 221 may be formed of the second material.

The third support layer 250 may be formed on a rear surface of the second light refracting layer 240. The third support layer 250 may be formed of the first material that is the same material as the first support layer 210 and the second support layer 230. The third support layer 250 may be formed of a PET material.

As shown in FIG. 17, the light refracting layer 220 may include the plurality of prisms 221 extending in an X-axis direction, which is a first direction. The second light refracting layer 240 may include the plurality of prisms 221 extending in a Y-axis direction, which is a second direction. That is, the plurality of prisms 221 disposed on the light refracting layer 220 may be formed to extend in a different direction from the plurality of prisms 221 disposed on the second light refracting layer 240.

Referring to FIG. 18, the complex sheet 200 may include an inclined portion S and a planar portion P. The side cover

270 may be formed on the inclined portion S. The inclined portion S may be formed along the outer peripheral surface of the complex sheet 200. The inclined portion S may be formed in a closed loop shape. The planar portion P may be a portion other than the inclined portion S of the complex sheet 200, and may be a planar portion extending horizontally with respect to the X-Y plane. The inclined portion S of the complex sheet 200 may have a reversed taper shape in the Z-axis direction. That is, a width of the upper surface of the complex sheet 200 (the surface in contact with the panel layer 100) may be longer than a width of the lower surface. This side cover 270 may close all of a space H exposed to the outside along the periphery of the complex sheet 200.

Referring back to FIG. 17, the side cover 270 may have the round shapes R1, R2, R3, R4 at the corners of the complex sheet 200. Since the side cover 270 has the round shapes R1, R2, R3, R4, the problem of damage to the panel layer 100, which may occur in the laser beam cutting process, can be reduced or prevented. Further, the surface irregularity problem, which may occur in the laser beam cutting process, can be prevented by the side cover 270 having the round shapes R1, R2, R3, R4.

According to the present disclosure, the side cover 270 may include a material formed to extend to the inclined portion S by melting at least one of the first support layer 210, the light refracting layer 220, the second support layer 230, the second light refracting layer 240 and the third support layer 250. FIG. 18 is an exemplary view, in which the side cover 270 is shown to include a first extension material 210S formed in a way that the first support layer 210 is melted and extended, a second extension material 220S formed in a way that the light refracting layer 220 is melted and extended, a third extension material 230S formed in a way that the second support layer 230 is melted and extended, a fourth extension material 240S formed in a way that the second light refracting layer 240 is melted and extended, and a fifth extension material 250S formed in a way that the third support layer 250 is melted and extended. However, as described above with reference to FIGS. 8 to 10, the side cover 270 may have a cross-section of a different shape depending on the cutting position and the position of the cutting line by the laser beam, etc.

While embodiments of the present invention have been described with reference to the attached drawings, it would be understood by those of ordinary skill in the art that the technical configuration of the present invention may be implemented in other detailed forms without changing the technical spirit or the essential features of the present invention. Thus, it should be noted that the above-described embodiments are provided as examples and should not be interpreted as limiting. Moreover, the scope of the present invention should be defined by the following claims rather than the detailed description provided above. Furthermore, the meanings and scope of the claims and all changes or modified forms derived from their equivalents should be construed as falling within the scope of the present invention.

What is claimed is:

1. A display panel, comprising:
a panel layer;
a complex sheet on a rear surface of the panel layer, the complex sheet including a planar portion and an inclined portion; and
a case in which the panel layer and the complex sheet are disposed, wherein the complex sheet includes:

a first support layer on the rear surface of the panel layer, the first support layer including a first material;

a light refracting layer on a rear surface of the first support layer, the light refracting layer including a second material;

a second support layer on a rear surface of the light refracting layer, the second support layer including the first material; and a side cover on the inclined portion of the complex sheet, the side cover covering an opening at a side surface of the light refracting layer.

2. A display panel, comprising:

a panel layer;

a complex sheet on a rear surface of the panel layer, the complex sheet including a planar portion and an inclined portion; and a case in which the panel layer and the complex sheet are disposed, wherein the complex sheet includes:

a first support layer on the rear surface of the panel layer, the first support layer including a first material;

a light refracting layer on a rear surface of the first support layer, the light refracting layer including a second material;

a second support layer on a rear surface of the light refracting layer, the second support layer including the first material; and a side cover on the inclined portion of the complex sheet, the side cover covering an opening at an edge of the light refracting layer, wherein the side cover includes at least one of a first extension material that extends from the first material of the first support layer, a second extension material that extends from the second material of the light refracting layer, and a third extension material that extends from the first material of the second support layer.

3. The display panel of claim 2, wherein the third extension material crosses a virtual line that extends from the light refracting layer to the inclined portion and a virtual line that extends from the first support layer to the inclined portion.

4. The display panel of claim 2, the third extension material crosses a virtual line that extends from the light refracting layer to the inclined portion and a virtual line that extends from the first support layer to the inclined portion, and the second extension material crosses the virtual line that extends from the first support layer to the inclined portion but does not cross the virtual line that extends from the light refracting layer to the inclined portion.

5. The display panel of claim 2, wherein the third extension material crosses a virtual line that extends from the light refracting layer to the inclined portion and the second extension material crosses a virtual line that extends from the first support layer to the inclined portion.

6. The display panel of claim 1, wherein the side cover is disposed around a periphery of the complex sheet.

7. The display panel of claim 1, wherein the side cover comprises at least one rounded corner.

8. The display panel of claim 1, wherein the light refracting layer includes a plurality of prisms.

9. The display panel of claim 8, wherein the plurality of prisms include a first prism having a first height and a first width, and a second prism having a second height and the first width, the second height different from the first height.

10. The display panel of claim 1, further comprising:

a second light refracting layer on the second support layer, the second light refracting layer including the second material; and a third support layer on the second light refracting layer, the third support layer including the first material.

11. The display panel of claim 10, wherein the side cover includes at least one of a first extension material that extends from the first material of the first support layer, a second extension material that extends from the second material of the light refracting layer, and a third extension material that extends from the first material of the second support layer, a fourth extension material that extends from the second material of the second light refracting layer, and a fifth extension material that extends from the first material of the third support layer.

12. The display panel of claim 10, wherein the light refracting layer includes a first plurality of prisms extending in a first direction, and the second light refracting layer includes a second plurality of prisms extending in the first direction.

13. The display panel of claim 10, wherein the light refracting layer includes a first plurality of prisms extending in a first direction, and the second light refracting layer includes a second plurality of prisms extending in a second direction that is different from the first direction.

14. The display panel of claim 13, wherein the first direction and the second direction form an angle between 0 degrees and 90 degrees.

15. The display panel of claim 1, wherein the complex sheet has a reversed taper shape.

16. The display panel of claim 1, wherein the case includes at least one of a cover bottom, a guide panel, and a case top, wherein a lower surface of the complex sheet does not contact the case.

17. A complex sheet, comprising:

a first support layer including a first material;

a light refracting layer on the first support layer, the light refracting layer including a plurality of light refracting elements of a second material that is different from the first material;

a second support layer on the light refracting layer, the second support layer including the first material; and a side cover disposed at an angle on the first support layer, the light refracting layer, and the second support layer, the side cover covering an opening at a side surface of the light refracting layer due to a shape of the plurality of light refracting elements.

18. The complex sheet of claim 17, wherein the side cover includes at least one of a first extension material that extends from the first material of the first support layer, a second extension material that extends from the second material of the light refracting layer, and a third extension material that extends from the first material of the second support layer.

19. The complex sheet of claim 17, wherein the plurality of light refracting elements include a plurality of prisms.

20. The complex sheet of claim 19, wherein the plurality of prisms include a first prism having a first height and a first width, and a second prism having a second height and the first width, the second height different from the first height.

21. The complex sheet of claim 17, where the angle of the side cover is greater than 0 degrees and less than 90 degrees.

* * * * *